Patented Mar. 12, 1929.

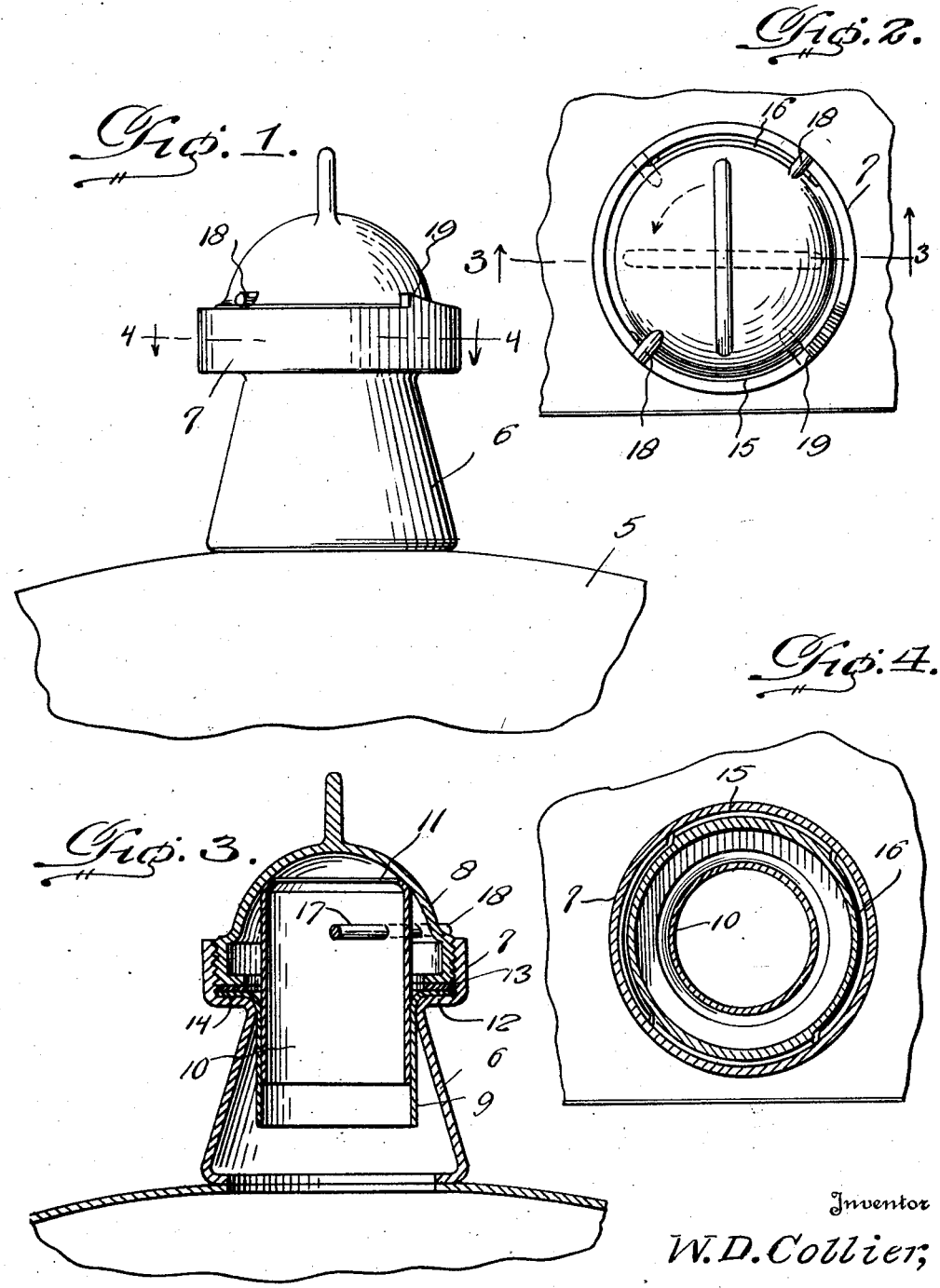

1,705,175

UNITED STATES PATENT OFFICE.

WILLIAM D. COLLIER, OF FORT MYERS, FLORIDA.

RECEPTACLE CLOSURE.

Application filed May 7, 1928. Serial No. 275,837.

This invention relates to closures for metallic receptacles and has particular reference to an improved closure for the filler pipe or neck of automobile radiators, gasoline and oil tanks, or the like.

It is well known that the filler pipe and closure cap of conventional automobile radiators, gasoline tanks and the like are provided with numerous thread convolutions which are shallow, narrow, and of a fine pitch, thus making it an extremely difficult matter and a time consuming operation to screw the cap into or out of the filler pipe or neck, and particularly without crossing of the threads of the cap and the filler pipe or neck when applying the cap.

The primary object of the present invention, therefore, is to provide a simple modification of and means which is readily applicable to the filler pipe and closure cap of conventional automobile radiators, gasoline tanks and the like, for facilitating application or removal of the cap and for insuring against crossing of the threads of the cap and filler pipe when the cap is being screwed into the filler pipe.

The invention consists in the novel form, combination and arrangement of parts hereinafter more fully described, shown in the accompanying drawing and claimed.

In the drawing:

Figure 1 is an elevational view of a radiator filler pipe closure modified and provided with guiding means in accordance with the present invention.

Figure 2 is a top plan view thereof.

Figure 3 is a central vertical section on line 3—3 of Figure 2; and

Figure 4 is a horizontal section on line 4—4 of Figure 1 with the cap turned to the dotted line released position of Figure 2.

Referring more in detail to the drawing, 5 indicates a conventional form of automobile radiator, gasoline tank, or the like provided with a top filler pipe or neck 6 having an enlarged upper or inlet end portion 7 which is of cylindrical form and threaded for reception of the closure cap 8.

In accordance with the present invention, the filler pipe or neck 6 is provided with a portion 9 below the inlet end portion 7 having a smooth cylindrical axial bore for snug sliding reception of the smooth cylindrical lower end portion of a guide tube 10 which is disposed axially of the cap member 8 with its upper end disposed concentrically within the latter and rigidly fastened to the closure cap 8 by soldering, welding or the like as indicated at 11. The guide tube 10 projects a sufficient distance below the cap 8 to have its lower end enter the upper end portion of the filler pipe portion 9 when the cap 8 is placed in position for screwing into the upper filler pipe portion 7, but prior to actual initial engagement of the threads of the cap with the threads of the filler pipe. This engagement of the tube 10 with the filler pipe portion 9 will positively effect axial alinement of the threaded portion of the cap with the threaded portion of the filler pipe, thereby effectively insuring that the threads of the cap will match up properly with the threads of the filler pipe so that the cap may be readily screwed into place without injuring the threads of either member by crossing of the threads.

In the construction shown, the closure cap 8 has its lower end portion externally threaded, and the filler pipe portion 7 is internally threaded to receive the cap. Moreover, in this form of the invention, the filler pipe 6 is of tapered form, and the enlargement of the portion 7 provides a horizontal annular shoulder at the lower end of the latter as at 12 against which the packing ring or gasket 13 may seat for insuring that the closure will be water-tight. This packing ring or gasket is disposed at the lower end of the cap 8 so that it will be firmly clamped between the lower end of the cap and the shoulder 12 when the cap is screwed into place. Still further, the cylindrical portion of the filler pipe in this form of the invention is constituted by a second cylindrical guide tube fitted in the lower portion of the filler pipe 6 and having an external annular flange 14 at its upper end seated on the shoulder 12 beneath the gasket 13 and permanently fastened to said shoulder by soldering, welding or the like.

The invention further embodies the provision of threads on the cap and filler pipe which are interrupted at each of opposite sides for slightly more than one-fourth the circumference of each part as at 15 and 16, respectively. The cap may thus be quickly completely entered into the upper end portion 7 of the filler pipe and then given a quarter turn to inter-engage the threads of the cap and filler pipe and tightly seat the cap on the gasket 13. In a like manner, the cap may be readily released for upward removal by simply turning it back a quarter turn to the dotted line position of Figure 2 and as shown by full lines in Figure 4, thus disengaging the threads of the cap from those of the filler pipe with facility. Means is provided to facilitate positioning of the cap with its threads registered with the unthreaded portions of the filler pipe, and to limit backward turning of the cap to a position wherein it is released. For this purpose the cap is provided with a diametric pin 17 having laterally projecting ends 18 arranged to extend across the upper edge of the upper portion 7 of the filler pipe when the cap is entered into the latter, and a stop lug 19 of ratchet-tooth form is provided on the upper edge of the filler pipe portion 7 at a point to be abutted at its vertical side by an end of the pin 17 when the cap is properly positioned to be so entered. By positioning either end 18 of the pin 17 at the vertical side of the lug 19 so that the latter will not interfere with clockwise turning and tightening of the cap, the threaded portions of the cap are readily registered with the unthreaded portions of the filler pipe so that the cap may be completely slid into the latter. The cap may then be turned to the full line position of Figure 2 so that it is securely held in place. This construction obviously eliminates any guess-work in applying or removing the cap, as regards the registration of threaded portions of the cap with unthreaded portions of the filler pipe in applying the cap or as regards sufficient backward turning of the cap to effect its release and permit its removal. An advantage is apparent in the saving of time and avoidance of wear due to scraping of the threads of the cap on those of the filler pipe in repeated application and removal of the cap.

From the above description it will be seen that I have provided a simple and efficient modification of and means for application to a conventional closure cap and filler pipe, whereby the cap may be quickly applied to and axially alined with the filler pipe so that the cap may be readily applied or removed without consuming a great amount of time and without injuring the threads of either member by crossing of the threads when the cap is applied.

Minor changes may be made without departing from the spirit and scope of the invention as claimed. If desired, the guiding means may be omitted, while the interrupted threads and the means to facilitate positioning of the cap may obviously be adapted to closures in which the filler neck is externally threaded and is adapted to receive an internally threaded cap.

What I claim as new is:

In a closure for a metallic receptacle, the combination with the filler pipe of the receptacle having an upper end portion provided with interrupted screw-threads, of a closure cap having a flange provided with interrupted screw-threads adapted to fit between or engage the screw-threads of the filler pipe, and cooperating members on the cap and the filler pipe to facilitate registration of the threaded portions of the cap with unthreaded portions of the filler pipe and permit sliding of the cap into the filler pipe and subsequent turning of the cap to engage its threads with those of the filler pipe, said filler pipe having an internal seat for engagement by the bottom of the cap when the latter is so slid into the filler pipe and given a quarter turn, said cooperating members embodying diametrically opposed pin members rigid with and projecting laterally from the cap and a stop lug on the upper edge of the filler pipe having a vertical side to be abutted by either pin member when the cap is released.

In testimony whereof I affix my signature.

WILLIAM D. COLLIER.